US012700253B2

(12) United States Patent
Ghalyan et al.

(10) Patent No.: US 12,700,253 B2
(45) Date of Patent: Aug. 4, 2026

(54) SIGNATURE VERIFICATION BASED ON TOPOLOGICAL STOCHASTIC MODELS

(71) Applicant: THE BANK OF NEW YORK MELLON, New York, NY (US)

(72) Inventors: Ibrahim Ghalyan, New York, NY (US); Binlin Chi, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 774 days.

(21) Appl. No.: 17/894,011

(22) Filed: Aug. 23, 2022

(65) Prior Publication Data

US 2024/0071117 A1     Feb. 29, 2024

(51) Int. Cl.
*G06V 30/32* (2022.01)
*G06N 3/047* (2023.01)
*G06V 30/182* (2022.01)

(52) U.S. Cl.
CPC ............. *G06V 30/32* (2022.01); *G06N 3/047* (2023.01); *G06V 30/1823* (2022.01)

(58) Field of Classification Search
CPC .. G06V 30/32; G06V 30/1823; G06V 30/333; G06V 30/40; G06V 30/41; G06V 40/30; G06V 40/33; G06V 40/388; G06V 40/394; G06N 3/047
See application file for complete search history.

(56) References Cited

U.S. PATENT DOCUMENTS

| | | | |
|---|---|---|---|
| 6,094,506 A | 7/2000 | Hullender | |
| 6,366,699 B1 | 4/2002 | Kuwano | |
| 6,661,908 B1 * | 12/2003 | Suchard | G06Q 40/08 |
| | | | 382/187 |
| 8,577,091 B2 | 11/2013 | Ivanov | |

(Continued)

OTHER PUBLICATIONS

H. S. Yoon, J. Y. Lee and H. S. Yang, "An online signature verification system using hidden Markov model in polar space," Proceedings Eighth International Workshop on Frontiers in Handwriting Recognition, Niagra-on-the-Lake, ON, Canada, 2002, pp. 329-333, doi: 10.1109/IWFHR.2002.1030931 (Year: 2002).*

(Continued)

*Primary Examiner* — Utpal D Shah
*Assistant Examiner* — Jack Peter Kraynak
(74) *Attorney, Agent, or Firm* — Pillsbury Winthrop Shaw Pittman, LLP

(57) ABSTRACT

The systems and methods relate to electronic signature verification based on topological stochastic models (TSM). The TSM may be trained on samples of known authentic signatures of a signee. Training the TSM may include TSM features extraction on the training samples to extract feature vectors, TSM features aggregation to aggregate the feature vectors, and optimal threshold estimation to determine an optimal threshold value. The optimal threshold value and overall aggregate of feature vectors may be used to evaluate feature vectors extracted from a signature to be verified. For example, a distance between the resulting feature vector (Continued)

extracted from the input sequence and the aggregated feature vector is determined. The distance is compared to the optimal threshold value to determine whether the signature in the input image is verified. The signature in the input image is verified if the distance is less than or equal to the optimal threshold value.

20 Claims, 11 Drawing Sheets

(56) References Cited

U.S. PATENT DOCUMENTS

| | | | | |
|---|---|---|---|---|
| 8,953,848 | B2 | 2/2015 | Ivanov | |
| 10,430,690 | B1 * | 10/2019 | Chen | G06F 18/2415 |
| 2006/0104484 | A1 * | 5/2006 | Bolle | G06V 40/1353 |
| | | | | 382/190 |
| 2008/0226175 | A1 | 9/2008 | Suzuki | |
| 2009/0037463 | A1 | 2/2009 | Terao | |
| 2010/0241859 | A1 | 9/2010 | Osmolovsky | |
| 2011/0249889 | A1 | 10/2011 | Kothandaraman | |
| 2011/0249891 | A1 * | 10/2011 | Li | G06F 18/254 |
| | | | | 382/165 |
| 2015/0310798 | A1 | 10/2015 | Heide | |
| 2018/0032837 | A1 * | 2/2018 | Hiroike | G06V 40/171 |
| 2020/0302173 | A1 * | 9/2020 | Deng | G06T 7/194 |
| 2022/0284213 | A1 | 9/2022 | Ghalyan | |

OTHER PUBLICATIONS

Shih Yin Ooi, Andrew Beng Jin Teoh, Ying Han Pang, Bee Yan Hiew, Image-based handwritten signature verification using hybrid methods of discrete Radon transform, principal component analysis and probabilistic neural network, Applied Soft Computing, vol. 40, 2016, pp. 274-282, ISSN 1568-4946 (Year: 2016).*

Li, B., Zhang, D. & Wang, K. Online signature verification based on null component analysis and principal component analysis. Pattern Anal Applic 8, 345-356 (2006). https://doi.org/10.1007/s10044-005-0016-4 (Year: 2006).*

E. J. R. Justino, A. El Yacoubi, F. Bortolozzi and R. Sabourin, "An off-line signature verification system using hidden Markov model and cross-validation," Proceedings 13th Brazilian Symposium on Computer Graphics and Image Processing (Cat. No. PR00878), Gramado, Brazil, 2000, pp. 105-112 (Year: 2000).*

G. Rigoll and A. Kosmala, "A systematic comparison between on-line and off-line methods for signature verification with hidden Markov models," Proceedings. Fourteenth International Conference on Pattern Recognition (Cat. No. 98EX170), Brisbane, QLD, Australia, 1998, pp. 1755-1757 vol. 2 (Year: 1998).*

R. K. Bharathi and B. H. Shekar, "Discriminative DCT-MLP based approach for off-line signature verification," 2014 International Conference on Advances in Computing, Communications and Informatics (ICACCI), Delhi, India, 2014, pp. 2309-2315, doi: 10.1109/ICACCI.2014.6968585. (Year: 2014).*

Sima Shariatmadari, Sima Emadi, Younes Akbari, Nonlinear Dynamics Tools for Off-line Signature Verification Using One-class Gaussian Process, International Journal of Pattern Recognition and Artificial Intelligence, (Year: 2019).*

Moises Diaz, Miguel A. Ferrer, Donato Impedovo, Muhammad Imran Malik, Giuseppe Pirlo, and Réjean Plamondon. 2019. A Perspective Analysis of Handwritten Signature Technology. ACM Comput. Surv. 51, 6, Article 117 (Nov. 2019), 39 pages. (Year: 2019).*

E . . . -M. Nel, J. A. du Preez and B. M. Herbst, "Estimating the pen trajectories of static signatures using hidden Markov models," in IEEE Transactions on Pattern Analysis and Machine Intelligence, vol. 27, No. 11, pp. 1733-1746, Nov. 2005, (Year: 2005).*

International Search Report dated May 2, 2023, issued in corresponding International Application No. PCT/US2022/041637 (3 pgs.).

International Preliminary Report on Patentability & Written Opinion of the International Searching Authority, dated Mar. 6, 2025, issued in corresponding International Application No. PCT/US2022/041637 (8 pgs.).

H.S. Yoon et al., "An On-line Signature Verification System Using Hidden Markov Model in Polar Space", Frontiers in Handwriting Recognition, 2002, Proceedings of the Eighth International Workshop on Frontiers in Handwriting Recognition, Aug. 6-8, 2002, pp. 329-333.

* cited by examiner

400 ⟍

| Convert RGB image to grayscale |
| :---: |
| 402 |

↓

| Convert grayscale image to binary |
| :---: |
| 404 |

↓

| Convert the (x,y) coordinates of signature lines to symbols |
| :---: |
| 406 |

↓

| Arrange the array of symbols into a sequence of symbols. |
| :---: |
| 408 | a   b   c   d   e   f   g h   i   j   k   l   m   n

↓

| Generate the topological stochastic matrix (TSM) of obtained symbols |
| :---: |
| 410 |

↓

| Compute the vector of eigenvalues of the TSM |
| :---: |
| 412 |

Figure 7:
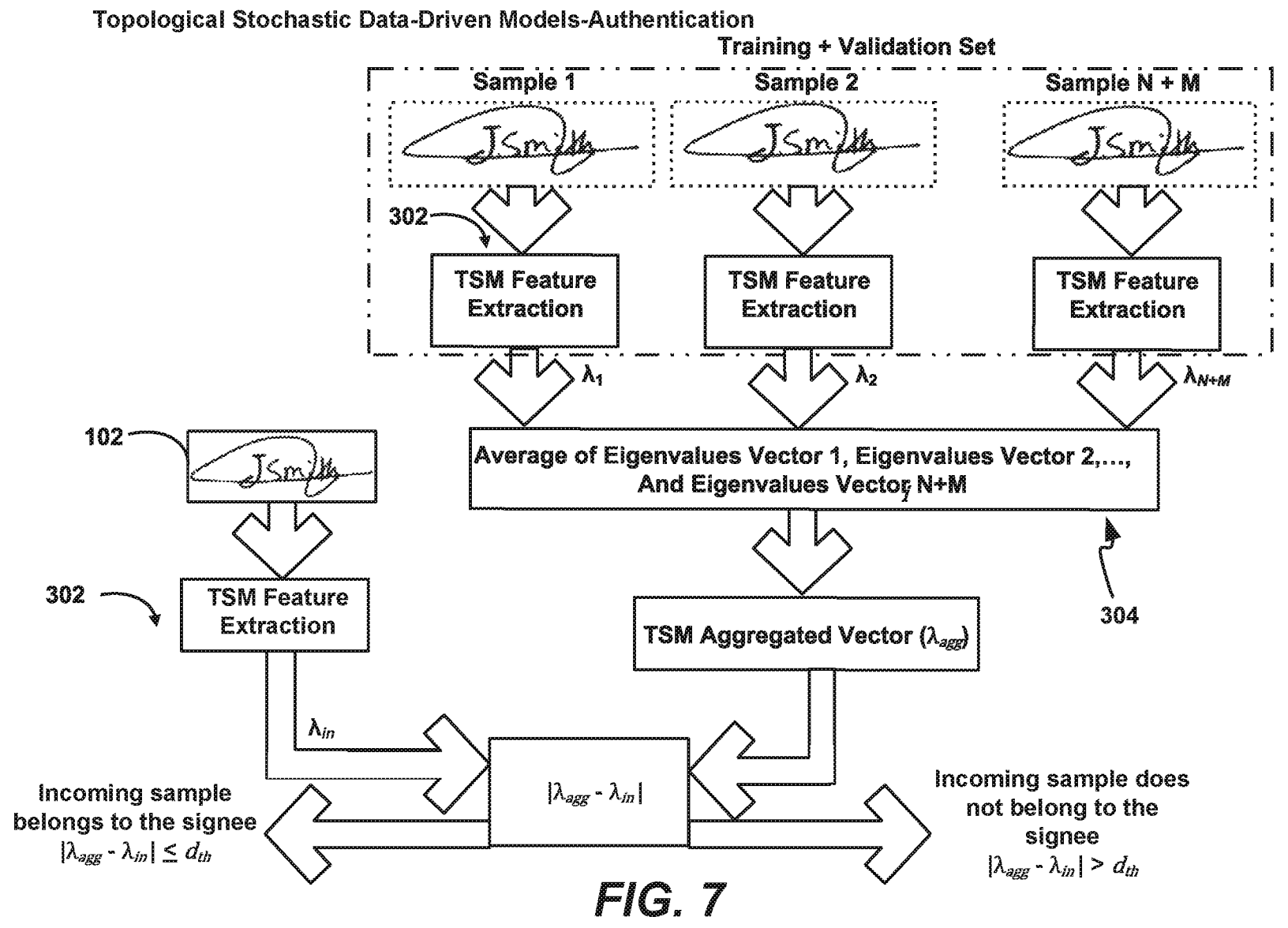

Topological Stochastic Data-Driven Models-Authentication

Training + Validation Set

Sample 1   Sample 2   Sample N + M

TSM Feature Extraction

302

$\lambda_1$   $\lambda_2$   $\lambda_{N+M}$

Average of Eigenvalues Vector 1, Eigenvalues Vector 2,..., And Eigenvalues Vector N+M

304

TSM Aggregated Vector ($\lambda_{agg}$)

102

TSM Feature Extraction

302

$\lambda_{in}$ $|\lambda_{agg} - \lambda_{in}|$

Incoming sample does not belong to the signee
$|\lambda_{agg} - \lambda_{in}| > d_{th}$ Incoming sample belongs to the signee
$|\lambda_{agg} - \lambda_{in}| \leq d_{th}$

Access a plurality of training images, the training images include a first image of a first authentic signature and a second image of a second authentic signature
802

Convert each training image from among the plurality of training images to a binary image
804

Partition each binary image into K partitions.
806

For each binary image: assign a unique symbol for each partition in the binary image
808

For each binary image: determine a plurality of pixel coordinates corresponding to signature lines in the binary image
810

For each binary image: determine, for the set of pixel coordinates, a sequence of symbols
812

↓

For each binary image: generate a stochastic transition matrix
814

↓

Generate a vector of eigenvalues for the stochastic transition matrix
816

↓

Group a first set (N) of the plurality of eigenvalues into a training set R and a remaining set (M) of the plurality of eigenvalues into a validation set V
818

↓

Aggregate the N training vectors to generate an aggregate vector
820

↓

Perform optimal threshold estimation to generate an optimum threshold value
822

↓

Aggregate all vectors from the training set R and the validation set V to generate an overall aggregate vector
824

Access an input signature of the individual to be authenticated
902

Identify a TSM trained to authenticate signatures from the individual
904

Obtain a binary image of the input signature
906

Split the binary image into a plurality of partitions
908

Assign a symbol to each partition of the plurality of partitions
910

To 910

900B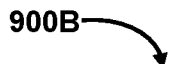

Identify pixel coordinates in the binary image that include at least a
portion of the input signature
912

Determine a sequence of symbols corresponding to the partitions that
correspond to the identified pixel coordinates
914

Determine an input stochastic transition matrix based on the sequence
916

Generate an input vector of eigenvalues baed on the input stochastic
transition matrix
918

Getermine a distance between the input vector of eigenvalues and the
aggregate vector of eigenvalues of the TSM
920

Determine whether the input signature is authentic based on the
distance
920

FIG. 9B

SIGNATURE VERIFICATION BASED ON TOPOLOGICAL STOCHASTIC MODELS

RELATED APPLICATIONS

The subject matter of this application is related to U.S. patent Ser. No. 17/192,369, entitled "METHODS AND SYSTEMS FOR REAL-TIME ELECTRONIC VERIFICATION OF CONTENT WITH VARYING FEATURES IN DATA-SPARSE COMPUTER ENVIRONMENTS," filed on Mar. 4, 2021, which is incorporated by reference in its entirety herein.

BACKGROUND

Content verification may involve determining that certain content is authentic. Despite the tangible progress in artificial intelligence ("AI") and its application to content verification, in many disciplines, verification still requires manual review. This is particularly true when the content is a user's signature or other content that requires verification.

For example, the use of AI for image recognition and content identification has been pursued using deep learning techniques. However, deep learning requires that there is a robust amount of data available to train a deep learning model. Such data may be unavailable particularly when the deep learning model is tasked to learn from specific data, such as a user's signature or authenticity of specific digital content. What may further exacerbate this issue is when only a single data point is available for training and verification. For example, a single class signee is a signee that is the only one who is authorized to sign on behalf of an entity. Signature verification of single class signees and other single data point classes may be prone to false positive results.

SUMMARY

Various systems and methods may address the foregoing and other problems. For example, a system may train and use a machine-learning model that learns topological features of content in images. For example, the machine-learning model may be trained to verify electronic signatures. In particular, the system may use a training subsystem to train a topological stochastic model (TSM). The training subsystem may access training samples that each include an image of a signature of a signee that is known to be authentic. The training subsystem may perform TSM features extraction, TSM features aggregation, and optimal threshold estimation.

The TSM features extraction may include dividing the training samples into training and validation sets. An aggregate vector of eigenvalues of training samples are determined, followed by computation of maximum distance between aggregated vector and vector of eigenvalues of each image of the validation set. The maximum distance represents the optimal threshold that will be leveraged to determine whether or not a signature belongs to the signee. The aggregated vector of eigenvalues is estimated for all images (both training and validation). The final aggregated vector along with the optimal threshold represent the TSM.

An input image of a signature to be verified may be evaluated by the TSM. For example, a feature vector may be generated based on TSM feature extraction performed on the input image. A distance between the resulting feature vector extracted from the input sequence and the aggregated feature vector is determined. The distance is compared to the optimal threshold value to determine whether the signature in the input image is verified. For example, the signature in the input image is verified if the distance is less than or equal to the optimal threshold value.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

Features of the present disclosure may be illustrated by way of example and not limited in the following figure(s), in which like numerals indicate like elements, in which:

FIG. 7 illustrates an example of generating a verification result of an input image evaluated against a trained TSM both training and validation data;

FIG. 8A illustrates a first portion of an example of a method of training a TSM;

FIG. 8B illustrates a second portion of an example of a method of training a TSM; FIG. 9B illustrates a second portion of an example of a method of verifying an input image against a trained TSM.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
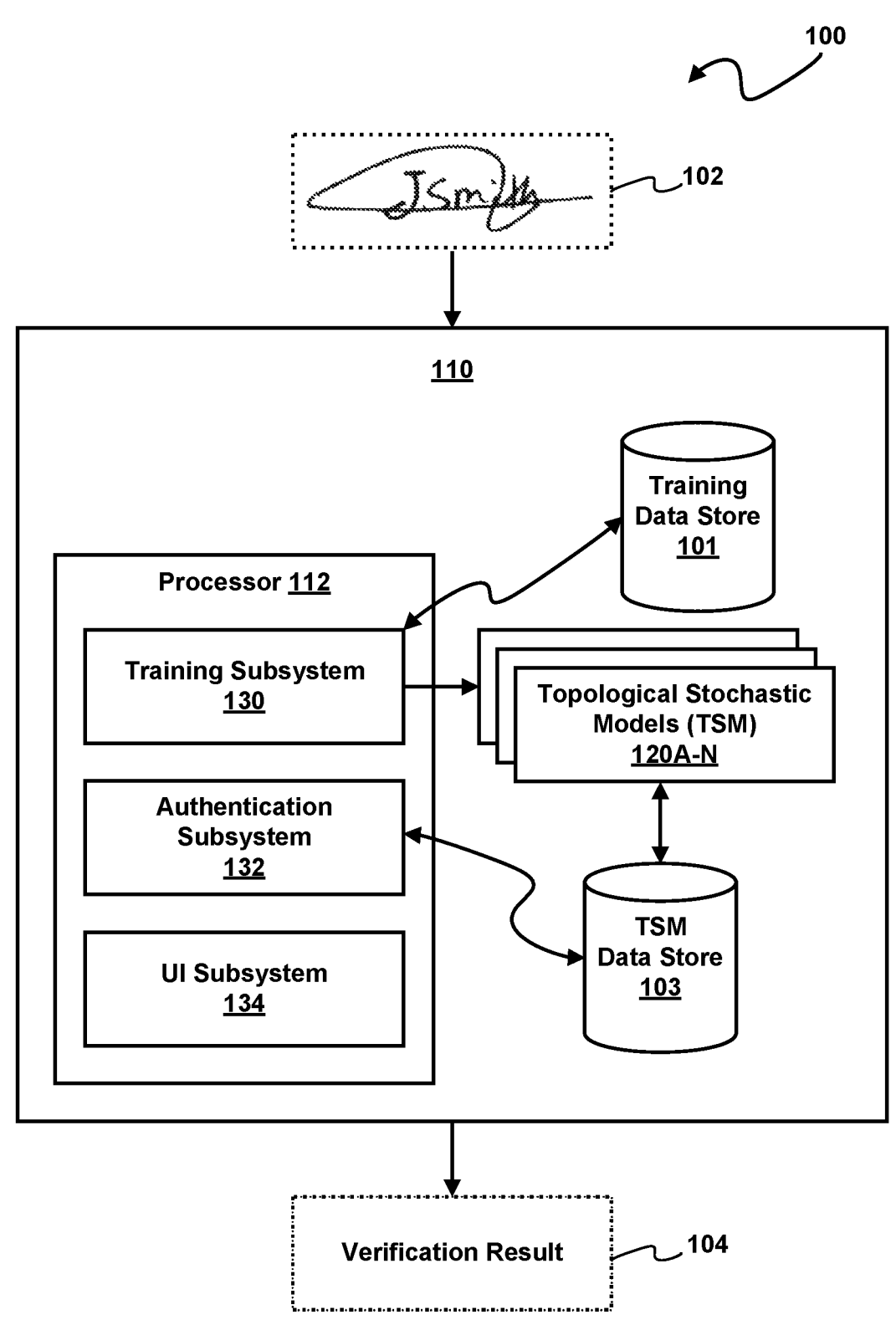
FIG. 1 illustrates an example of a system for electronic signature verification using a machine-learning model trained on topological features extracted from authentic signatures.

FIG. 1 illustrates an example of a system 100 for electronic signature verification using a machine-learning model trained on topological features extracted from authentic signatures. The term "authentic" with respect to a signature refers to having been signed by a person with whom the signature is associated. It should be noted that although examples of signature verification are used for illustration throughout the disclosure, the system 100 may be used in other contexts in which topological features in electronic images may be detected or otherwise identified.

The system 100 may include a computer system 110 that accesses an input image 102 to be authenticated and generates a verification result 104. The input image 102 may be an electronic image such as a scan, a photograph, or other electronic content. The input image 102 may include an image of a signature or other content to be identified and/or verified. In a signature verification context, usually, though not necessarily, the signature is a "wet signature" that is signed by the person using wet ink on paper that is scanned, photographed, or otherwise imaged. However, other forms of signatures may be verified as well, such as a signature on a touch screen or other electronic medium. The computer system 110 may evaluate the input image 102 with a machine-learning model trained to identify and/or verify contents of the input image 102. The machine-learning model may output a verification result 104 is data that indicates an identification and/or verification of the content. For example, the verification result 104 may include an indication whether or not a signature in the input image 102 is authentic.

The computer system 110 may include one or more processors 112, a training datastore 101, a TSM datastore 103, and/or other components. The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some embodiments, processor 112 may comprise a plurality of processing units. These processing units may be physically located within the same device, or processor 112 may represent processing functionality of a plurality of devices operating in coordination.

As shown in FIG. 1, processor 112 is programmed to execute one or more computer program components. The computer program components may include software programs and/or algorithms coded and/or otherwise embedded in processor 112, for example. The one or more computer program components or features may include a training subsystem 130, an authentication subsystem 132, a UI subsystem 134, and/or other components or functionality.

Processor 112 may be configured to execute or implement 130, 132, and/or 134 by software; hardware; firmware; some combination of software, hardware, and/or firmware; and/or other mechanisms for configuring processing capabilities on processor 112. It should be appreciated that although 130, 132, and 134 are illustrated in FIG. 1 as being co-located in the computer system 110, one or more of the components or features 130, 132, and 134 may be located remotely from the other components or features. The description of the functionality provided by the different components or features 130, 132, and 134 described below is for illustrative purposes, and is not intended to be limiting, as any of the components or features 130, 132, and 134 may provide more or less functionality than is described, which is not to imply that other descriptions are limiting. For example, one or more of the components or features 130, 132, and 134 may be eliminated, and some or all of its functionality may be provided by others of the components or features 130, 132, and 134, again which is not to imply that other descriptions are limiting. As another example, processor 112 may include one or more additional components that may perform some or all of the functionality attributed below to one of the components or features 130, 132, and 134.

The training subsystem 130 may train topological stochastic models (TSMs) 120 based on training and validation data, which may be stored the training datastore 101. The training and validation data may include various samples of one or more signatures known to be authentic for a particular user. The training subsystem 130 may extract topological features from the samples, aggregate the features, and perform optimal threshold estimation to train a TSM 120 that is able to identify or authentic the particular user's signature. The optimal threshold estimation may generate an optimal threshold value that represents a range of deviation from a topology of an authentic signature for a user as determined from the samples of the user's authentic signature in the training datastore 101. Thus, the computer system 110 is able to tolerate deviation in topology of a signature based on deviations amongst the samples, while also reducing false positive verification results since such tolerance is limited to the observed deviations in the samples. A trained TSM 120 may be stored in the TSM datastore 103. Storing a TSM 120 may include storing the learned features from training the TSM 120, model parameters used for training, identifying information for the user or entity associated with the user for retrieval and comparison, and/or other data used for training that may be retrieved by the authentication subsystem 132 to execute the TSM 120.

The authentication subsystem 132 may verify an input image 102 by extracting topological features from the input image 102 in the same way that the training subsystem 130 extracts topological features from samples in the training datastore 101. The authentication subsystem 132 may retrieve and execute a TSM 120 to evaluate the extracted topological features from the input image 102 against the TSM 120. The authentication subsystem 132 may determine a distance between the extracted features and modeled features from the TSM 120 and generate the verification result 104 based on the distance. For example, the authentication subsystem 132 may compare the distance to an optimal threshold value determined from the optimal threshold estimation. For example, if the distance is greater than the optimal threshold value, the authentication subsystem 132 may determine that the input image 102 is not authentic. Otherwise, if the distance is less than or equal to the optimal threshold value, the authentication subsystem 132 may determine that the input image 102 is authentic.

The UI subsystem 134 may generate data for displaying or otherwise providing the verification result 104. For example, the data may include a graphical user interface that includes the verification result 104, an electronic message that indicates the verification result 104, and/or other information that may be displayed or transmitted that conveys the verification result 104.

The computer system 110 may be used in various ways. For example, as one practical application, the computer system 110 may authenticate a signature received as part of a wire instruction (WI) in connection with a transaction. The WI may be a signed document, and transmitted as a part of a procedure to release a payment indicated by the WI. A first step in this process is to verify that a signee is authorized to perform the release of the payment. Such verification is performed by having a list of authorized signees, called the incumbency certificate (IC), who have the authority to release a certain amount in a transaction. The list of authorized individuals for each transaction and/or document in a transaction may differ. The system may have instructions stating who is authorized to release an allowable amount of payment with the signature of each authorized signee. Each time the system receives a wire instruction from a client, the signature on the wire instruction is verified against the pre-defined list of authorized signees. If signatures on the considered wire instruction match corresponding authorized signatures, then the system releases the indicated payment.

Currently, manual signature verification is required for such tasks. To realize the automation of such signature authentication process, an efficient signature verification system is needed, where the input to the system is an image of a signature, and the output is a decision determining if the given signature belongs to a signee or not. Some systems may be able to automatically perform signature verification with high accuracy. However, these systems may generate a high number of false positive results when a given IC includes only single signature as opposed to multiple signatures of multiple authorized signees.

These and other issues above rendered the automation process of the signature verification a challenging task. To address such issues and enable successful signature verification, the computer system 110 may train and use the TSM 120 based on topological features that reduce false positive verifications, as described herein. The computer system 110 may be used in contexts other than signature verification. For example, as referred to herein, "content" should be understood to mean an electronically consumable and/or scannable user asset, such as images, video clips, audio content, rotating images, documents, playlists, websites, articles, books, electronic books, blogs, advertisements, chat sessions, social media content, applications, games, and/or any other media or multimedia and/or combination of the same.

For example, the input image 102 may comprise a medical image, and the verification result 104 may comprise an identification of a condition related to the medical image. For example, the TSM 120 may determine whether or not the medical image (or indicia in the medical image) corresponds to indicia of a known ailment in order to determine whether or not a user corresponding to the medical image has the known ailment. In another example, input image 102 may comprise a biometric identifier (e.g., a fingerprint, an iris scan, etc.) that requires electronic verification, and verification result 104 may comprise a determination of whether or not the biometric identifier matches an authenticated biometric identifier. For example, TSM 120 may determine whether or not the biometric identifier that requires electronic verification matches the authenticated biometric identifier in order to verify the identity of a user corresponding to the biometric identifier. In these cases, the extracted features from an input may be used as inputs at a decision-making stage in the TSM 120, which may be a classification model that is trained to perform the mapping between the extracted features and a corresponding label (e.g., if an image corresponds to a positive or negative condition, identifier, etc.).

For example, the spread of the coronavirus, also called Covid-19, in many countries around the world resulted in a tangible increase in the number of cases, causing significant outages in numbers of staff at healthcare facilities and hospitals. Hence automation of Covid-19 diagnosis supports workers by addressing outages in the number of healthcare workers, and assists in reducing potential risk of infection to medical staff. The computer system 110 may be applied to the diagnosis of Covid-19 cases based on images captured by computerized tomography ("CT") scanners. Using the CT scan images, the computer system 110 may precisely diagnose the status of patients and enable accurate detection of the infection of Covid-19. The computer system 110 may detect Covid-19 based on CT scan images by extracting the features of CT scan images. The extracted features are used as inputs in the decision-making stage of the TSM 120, which is a classification model that is trained to perform the mapping between the extracted features and the corresponding label (e.g., if the CT scan image corresponds to positive or negative cases).

In another example, the computer system 110 may assist in determination based on other content. For example, the input image 102 may comprises content requiring identification, and verification result 104 may comprise a label for known content. For example, the TSM 120 may determine whether or not the content corresponds to a known image in order to identify the image. In another example, the input image 102 may comprises an image that requires electronic verification, and verification result 104 may comprise a determination of whether or not the image matches an authenticated image. For example, the TSM 120 may determine whether or not a user is present at a location (e.g., based on a known image of a user matching an image of a user at a location).

For example, sorting documents according to their category is one of the tedious problems in many institutions, especially with the growing number of daily documents processed. Hence, the automation of the process of document sorting lead practitioners to develop a mechanism that can automatically categorize incoming documents. While natural language processing (NLP) plays a key role in the field of document classification based on the text of an incoming document, its applicability is tangibly limited for addressing pictorial elements, like logos, stamps, and signatures, and image-based documents with limited ability to extract its corresponding text. Therefore, the computer system 110 may be readily applied to the classification of images in of documents. Thus, features of scanned images are extracted by the computer system 110, as described herein. Then the TSM 120 (a classifier and/or other decision-making model) is trained based on the extracted features, and given labels of each document, thereby realizing the process of document sorting in an elegant and efficient way.

Figure 2:
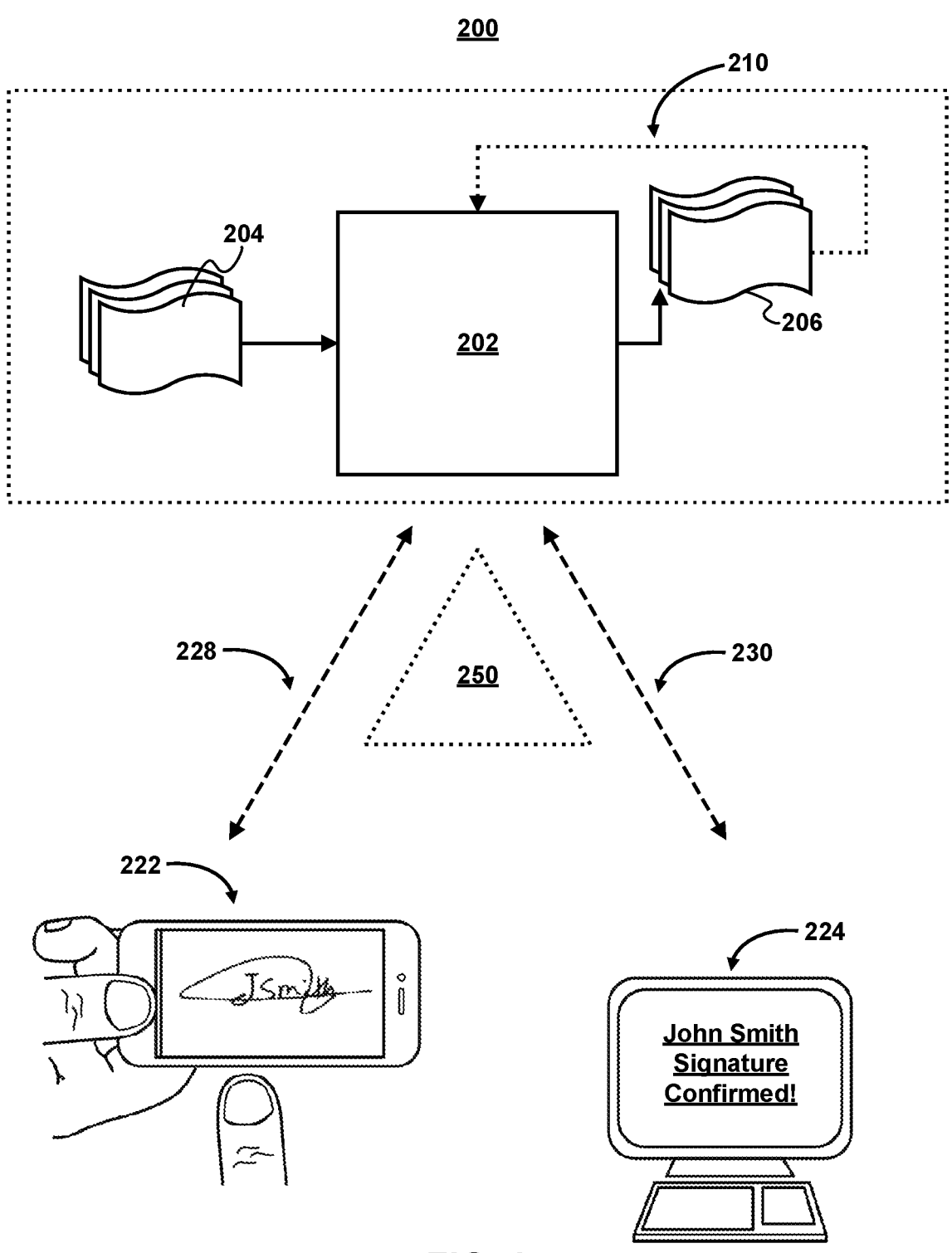
FIG. 2 depicts an example implementation of the system illustrated in FIG. 1.

FIG. 2 depicts an example implementation of the system illustrated in FIG. 1. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system, and may feature one or more component devices. It should also be noted that system 200 is not limited to three devices. Users may, for instance, utilize one or more devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of mobile device 222, those operations may, in some embodiments, be performed by components of cloud components 210. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data.

Additionally, as mobile device 222 and user terminal 224 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen and/or a dedicated input device such as a remote control, mouse, voice input, etc.). Additionally, the devices in system 200 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228 and 230. Communication paths 228 and 230 may include the Internet, a mobile phone network, a mobile voice or data network (e.g., a 5G or LTE network), a cable network, a public switched telephone network, or other types of communications networks or combinations of communications networks. Communication paths 228 and 230 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. For example, one or more of cloud components 210 may include a microservice and/or components thereof. In some embodiments, the microservice may be a collection of applications that each contain information about a user, content, etc.

Cloud components 210 may include model 202, which may be a machine learning model. Model 202 may take inputs 204 and provide outputs 206. The inputs may include multiple datasets, such as a training dataset and a test dataset. Each of the plurality of datasets (e.g., inputs 204) may include data subsets related to user data, original content, and/or alternative content. Model 202 may include a TSM 120 illustrated in FIG. 1. In some embodiments, outputs 206 may be fed back to model 202 as inputs to train model 202. For example, the system may receive a first labeled feature input, wherein the first labeled feature input is labeled with known content (e.g., an authenticated signature). The system may then train the first machine learning model to classify the first labeled feature input into a class corresponding to the known content.

In another embodiment, model 202 may update its configurations (e.g., weights, biases, or other parameters) based on the assessment of its prediction (e.g., outputs 206) and reference feedback information (e.g., user indication of accuracy, reference labels, or other information). In another embodiment, where model 202 is a neural network, connection weights may be adjusted to reconcile differences between the neural network's predictions and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 202 may be trained to generate better predictions.

In some embodiments, model 202 may include an artificial neural network. In such embodiments, model 202 may include an input layer and one or more hidden layers. Each neural unit of model 202 may be connected with many other neural units of model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 202 may be self-learning and trained, rather than explicitly programmed, and can perform significantly better in certain areas of problem solving, as compared to traditional computer programs. During training, an output layer of model 202 may correspond to a classification of model 202, and an input known to correspond to that classification may be input into an input layer of model 202 during training. During testing, an input without a known classification may be input into the input layer, and a determined classification may be output.

In some embodiments, model 202 may include multiple layers (e.g., where a signal path traverses from front layers to back layers). In some embodiments, back propagation techniques may be utilized by model 202, where forward stimulation is used to reset weights on the "front" neural units. In some embodiments, stimulation and inhibition for model 202 may be more free-flowing, with connections interacting in a more chaotic and complex fashion. During testing, an output layer of model 202 may indicate whether or not a given input corresponds to a classification of model 202 (e.g., an incident).

The system may receive user data via a microservice and/or other means. For example, the microservice may comprise a collection of applications that each collect one or more of a plurality of variables. For example, the system may extract user data from an API layer operating on a user device, or at a service provider (e.g., via a cloud service accessed by a user). Additionally or alternatively, the system may receive user data files (e.g., as a download and/or streaming in real-time or near real-time).

System 200 also includes API layer 250. For example, through the use of an API layer, the system may more easily send and receive content that requires verification. For example, in some embodiments, the system may be implemented as one or more APIs and/or an API layer. In some embodiments, API layer 250 may be implemented on mobile device 222 or user terminal 224. Alternatively or additionally, API layer 250 may reside on one or more of cloud components 210. API layer 250 (which may be A REST or Web services API layer) may provide a decoupled interface to data and/or functionality of one or more applications. API layer 250 may provide a common, language-agnostic way of interacting with an application. Web services APIs offer a well-defined contract, called WSDL, that describes the services in terms of its operations, and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services as well as for exchanging information with partners in B2B transactions.

API layer 250 may use various architectural arrangements. For example, system 200 may be partially based on API layer 250, such that there is strong adoption of SOAP and RESTful Web-services, using resources like Service Repository and Developer Portal, but with low governance, standardization, and separation of concerns. Alternatively, system 200 may be fully based on API layer 250, such that separation of concerns between layers like API layer 250, services, and applications are in place.

In some embodiments, the system architecture may use a microservice approach. Such systems may use two types of layers: Front-End Layer and Back-End Layer, where microservices reside. In this kind of architecture, the role of the API layer 250 is to provide integration between Front-End and Back-End. In such cases, API layer 250 may use RESTful APIs (exposition to front-end or even communication between microservices). API layer 250 may use AMQP (e.g., Kafka, RabbitMQ, etc.). API layer 250 may use incipient usage of new communications protocols such as gRPC, Thrift, etc.

In some embodiments, the system architecture may use an open API approach. In such cases, API layer 250 may use commercial or open source API Platforms and their modules. API layer 250 may use developer portal. API layer 250 may use strong security constraints applying WAF and DDoS protection, and API layer 250 may use RESTful APIs as standard for external integration.

Training TSMs

Figure 3:
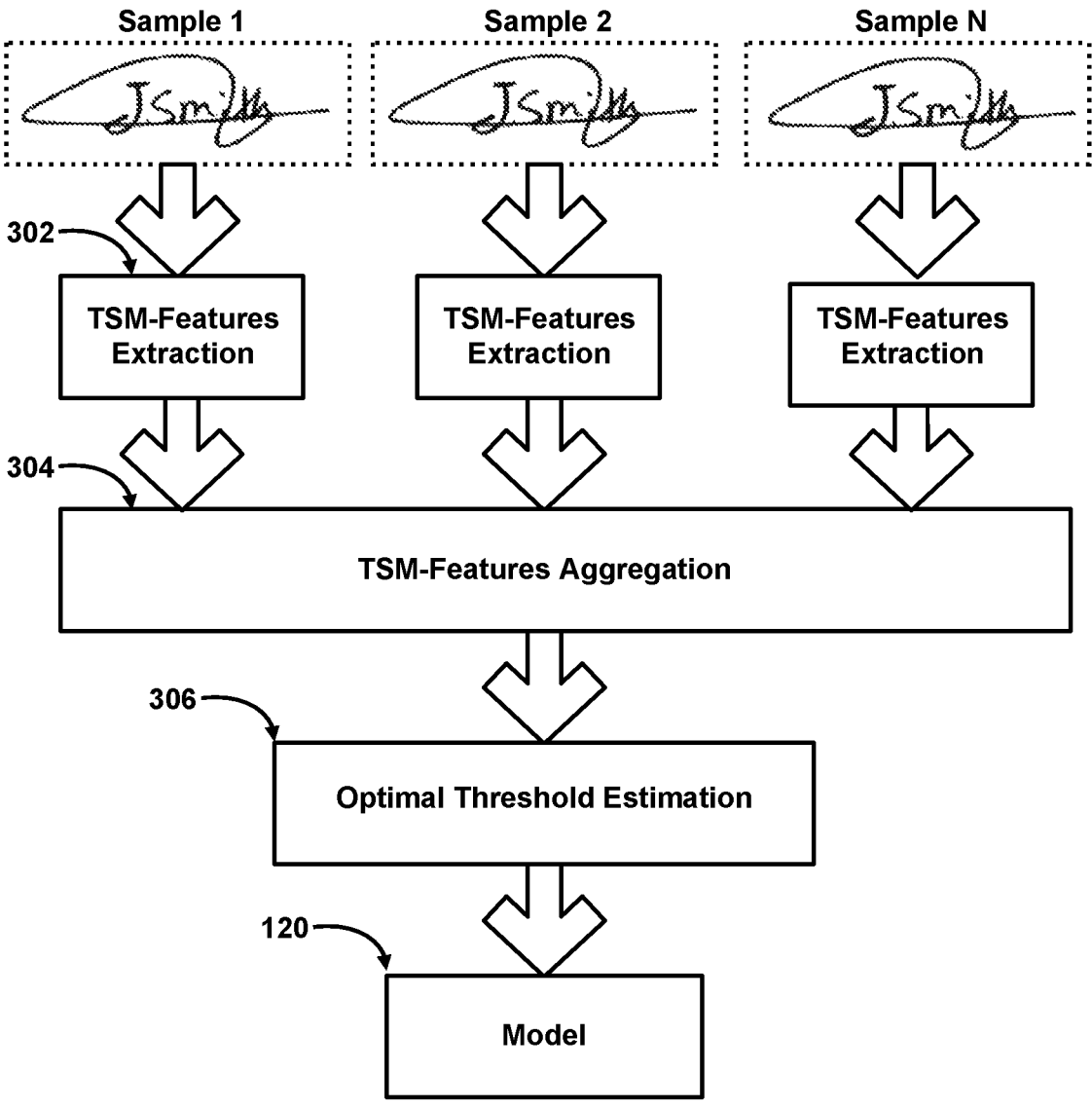
FIG. 3 illustrates an example of training a TSM based on TSM feature extraction, TSM feature aggregation, and optimal threshold estimation.

FIG. 3 illustrates an example of training a TSM 120 based on TSM feature extraction 302, TSM feature aggregation 304, and optimal threshold estimation 306. The training subsystem 130 may access one or more samples (illustrated as Samples 1-N) of a user's authentic signature from the training datastore 101. Each Sample 1-N may be an image of an authentic signature of a user for which a TSM 120 is being trained to recognize and/or verify.

The training subsystem 130 may perform TSM feature extraction 302 on each of the Samples 1-N to generate respective feature vectors, referred to in the figures as vectors of eigenvalues. A feature vector may refer to a computational (such as numeric) representation of the topology of a signature. The vector representation may be based on the topology of the signature. The topology itself may be based on the shape of lines of the signature. Feature extraction 302 is described in more detail with respect to FIG. 4.

The training subsystem 130 may perform TSM feature aggregation 304 during which the extracted TSM features are aggregated. The aggregated TSM features represent the Samples 1-N and therefore may reflect variations across authentic signatures of the user, enabling toleration of variation in an authentic signature, whether such variation is caused by variations in the way the user makes a signature or artifacts from imaging or storing an image of the signature. An example of TSM feature aggregation 304 is described in more detail with respect to FIG. 5.

The training subsystem 130 may perform optimal threshold estimation 306 based on the aggregated TSM features and the signee TSM features. Optimal threshold estimation 306 may generate an optimal threshold value that is used to evaluate extracted TSM features of an input image 102 against the aggregated TSM features of the trained TSM 120.

TSM Feature Extraction

Figure 4:
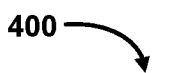
FIG. 4 illustrates an example of a method of TSM feature extraction for extracting feature vectors and a corresponding signature symbol representation.

FIG. 4 illustrates an example of a method 400 of TSM feature extraction 302 for extracting feature vectors and a corresponding signature symbol representation 401. It should be noted that the method 400 is an example of TSM feature extraction 302, which may be performed for training a TSM 120 as well as for extracting features of an input image 102 for electronic signature verification.

At 402, the method 400 may include converting a red-green-blue (RGB) image to grayscale. 402 may be performed in instances when an image of a signature (whether a Sample 1-N for training or an input image 102 for verifying) is an RGB image.

At 404, the method 400 may include converting the grayscale image to a binary image. Block 404 may be performed in instances when an image of a signature was originally an RGB image and then converted to grayscale at 402 or if the image of a signature was originally a grayscale image.

At 406 and 408, the method 400 may including symbolizing the signature to generate a symbol representation 401 of the signature, where each symbol a-n represents at portion of the signature. For example, at 406, the method 400 may include converting x, y coordinates (xy coordinates) of signature lines to symbols. Referring to signature representation 401, the signature may be partitioned into symbols a-n. Other numbers of symbols may be used as well. Each symbol a-n may represent a portion of the signature. Thus, each symbol a-n represents a portion of the topology of the signature. Each portion a-n may therefore include a line or other portion of the signature. It should be noted that the shape of the symbols a-n are shown as rectangular although other shapes or proportions of the symbols may be used. At 408, the method may include arranging the array of symbols a-n into a sequence. The sequence may refer to a particular order of the symbols a-n.

This ordering of symbols a-n may be used for symbol transitions, which may form the basis of a generated feature vector for the signature. For example, at 410, the method 400 may include generating a topological stochastic matrix (TSM) of the symbols a-n. The TSM may represent a number transitions needed to transition from one symbol to another symbol. The complexity of the TSM may therefore depend on the number partitions (K) used to symbolize the signature. At 412, the method 400 may include generating the feature vector based on the TSM. For example, the method 400 may include computing the vector of eigenvalues of the TSM.

TSM Feature Aggregation

Figure 5:
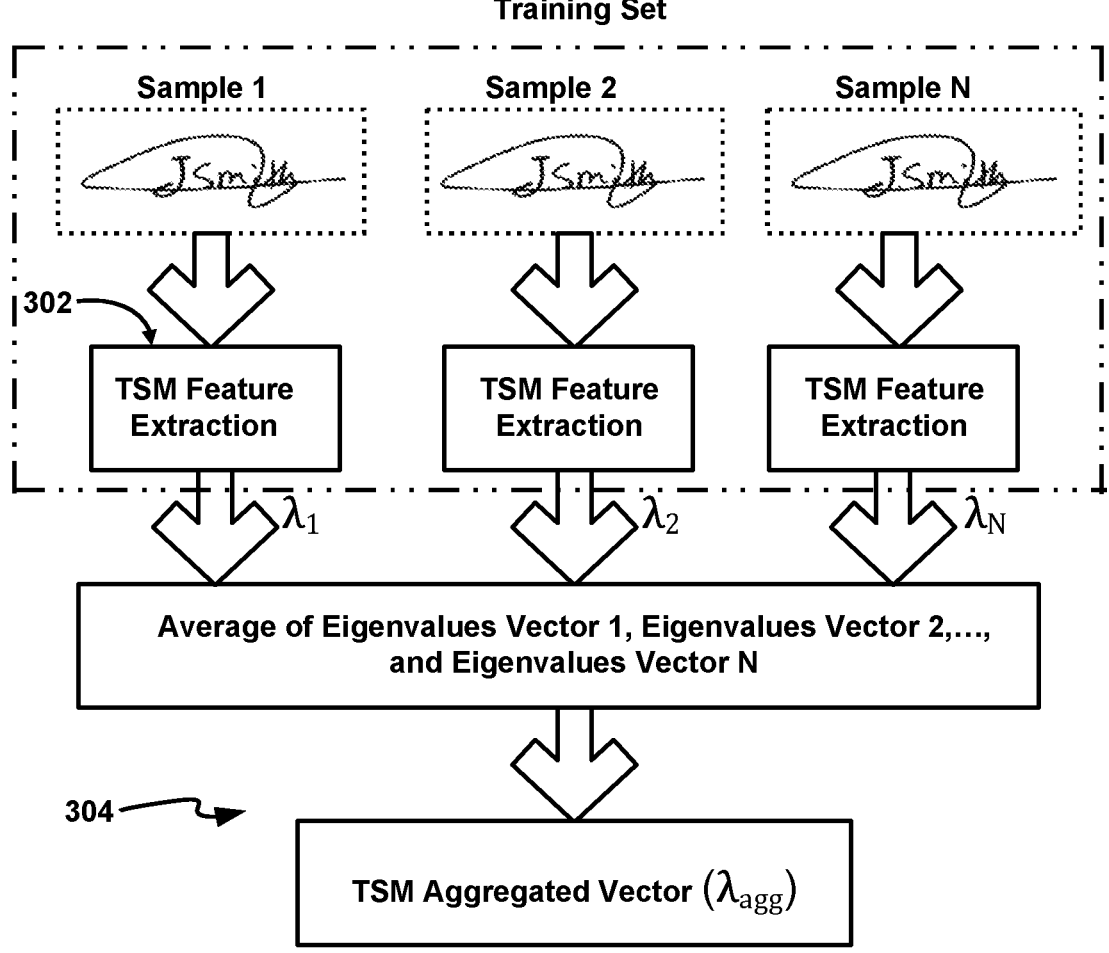
FIG. 5 illustrates an example of TSM feature aggregation for aggregating the feature vectors.

FIG. 5 illustrates an example of TSM feature aggregation 304 for aggregating the feature vectors $\lambda$. Extracted feature vectors (also referred to as vectors of eigenvalues or eigenvalue vectors) are illustrated as $\lambda_{1\text{-}N}$ respectively corresponding to extracted feature vectors for Samples 1-N. An aggregated feature vector may be generated by averaging the extracted feature vectors $\lambda_{1\text{-}N}$ to generate an aggregate feature vector $\lambda_{AGG}$.

Optimal Threshold Estimation

Figure 6:
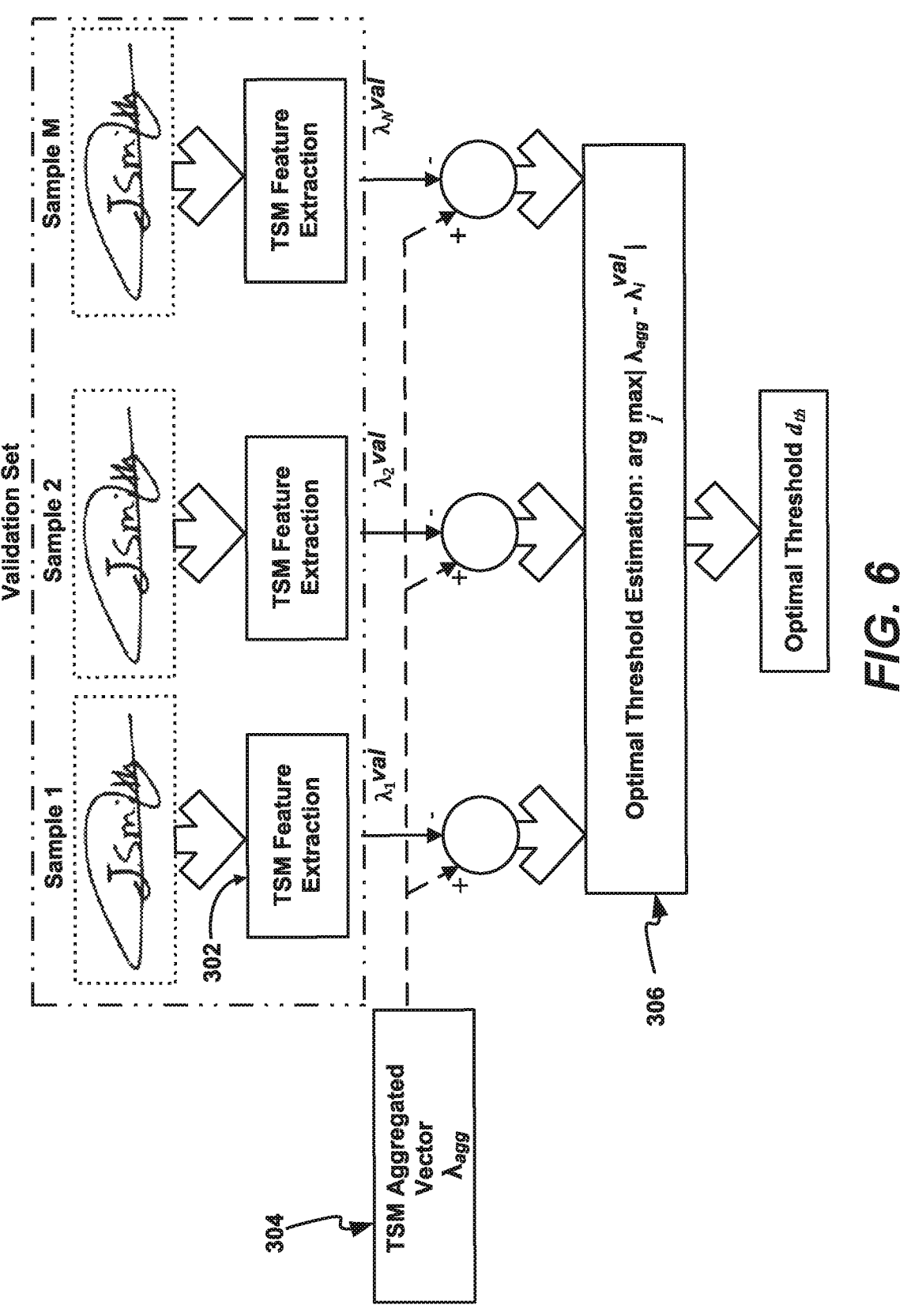
FIG. 6 illustrates an example of optimal threshold estimation for generating an optimal threshold value for evaluating an input sequence.

FIG. 6 illustrates an example of optimal threshold estimation 306 for generating an optimal threshold value $d_{th}$ for evaluating an input sequence. The optimal threshold value $d_{th}$ may be generated based on evaluating the aggregated vector $\lambda_{AGG}$ and values for individual vectors $\lambda_{1\text{-}N}$ for a validation dataset. For example, the optimal threshold value $d_{th}$ may be determined based on the largest distance between $\lambda_{AGG}$ and $\lambda_{1\text{-}N}$, given by Equation (1):

$$d_{th} = \text{argmax}\left|\lambda_{agg} - \lambda_i^{val}\right|, \tag{1}$$

in which $$\lambda_i^{val}$$

is a value for a signee vector $\lambda_i$ (where i corresponds to 1-N).

Electronic Signature Verification

FIG. 7 illustrates an example of generating a verification result of an input image 102 evaluated against a trained TSM 120 using both training and validation data. The TSM 120 may be trained via TSM feature extraction 302, TSM feature aggregation 304, and optimal threshold estimation 306. A feature vector $\lambda_{in}$ may be generated from the input image 102 via TSM feature extraction 302. A distance $|\lambda_{AGG}-\lambda_{in}|$ between the vector $\lambda_{in}$ and the aggregated vector $\lambda_{AGG}$ may be determined and compared to the optimum threshold value $d_{th}$ that was determined from optimal threshold estimation

306. If the distance $|\lambda_{AGG}-\lambda_{in}|$ is greater than the optimum threshold value $d_{th}$, then the input image 102 is determined to be invalid. If the distance $|\lambda_{AGG}-\lambda_{in}|$ is less than or equal to the optimum threshold value $d_{th}$, then the input image 102 is determined to be valid.

FIGS. 8A and 8B together illustrate respective portions 800A and 800B of an example of a method of training a TSM 120. The training process may be initialed with a plurality of training images and a number of partitions K. K may be configured as appropriate. Larger K values may provide increased resolution at the cost of model complexity, while smaller K values may provide faster training and execution at the cost of lower resolution.

At 802, the method 800 may include accessing a plurality of training images, the training images include a first image of a first authentic signature and a second image of a second authentic signature. For example, the method 800 may include accessing the plurality of training images from the training datastore 101.

At 804, the method 800 may include converting each training image from among the plurality of training images to a binary image. For example, if the training image is an red-green-blue (RGB) image, the method 800 may include converting the RGB image to a grayscale image, and then converting the grayscale image to a binary image. If the training image is a grayscale image, the method 800 may include converting the grayscale image to a binary image. If a given training image is already a binary image, then no conversion is performed on this image. Binarization provides an ability to detect whether a pixel is "on" (such as black) or "off" (such as white), which may ignore artifacts relating to pixel intensity that can lead to false positive results.

At 806-812, the method 800 may include performing signature symbolization on each of the binary images. For example, at 806, the method 800 may include partitioning a binary image into K partitions. Each K partition may be shaped as a rectangle or other shape. At 808, the method 800 may include assigning a unique symbol for each partition in the binary image. An example of K partitions and corresponding assigned symbols are illustrated in the signature representation 401 illustrated at FIG. 4 (which shows symbols a-n in which K=14).

At 810, the method 800 may include determining a plurality of pixel coordinates corresponding to signature lines in the binary image. For example, the method 800 may identify a set of pixel coordinates in an x, y coordinate space of the binary image that is "on" or black, indicating that the pixel is part of a signature imaged in the binary image. The set of pixel coordinates may be represented by $C_q$ in Equation 2:

$$C_q = \{(x_1,y_1), \ldots ,(x_{Nx},y_{Nx})\} \tag{2}.$$

At 812, the method 800 may include determining, for the set of pixel coordinates $C_q$, a sequence of symbols. For example, the symbols may each be ordered with respect to one another based on corresponding pixel coordinates that are part of the signature. The sequence of symbols may be represented by S in Equation 3:

$$S = \{s_i\}_{i=1}^N. \tag{3}$$

At 814, the method 800 may include generating a stochastic transition matrix $P_q$. The stochastic transition matrix is a measure of the probability of transitioning from one symbol to a next symbol, which is based on the topology of the signature. $P_q$ may be given by the Equation 4:

$$P_q = [\pi_{ij}] \tag{4}$$

In which:

$$\pi_{ij} = \frac{N(sj, si)}{N(si)}$$

At 816, the method 800 may include generating a vector of eigenvalues $\lambda_q$ for the stochastic transition matrix $P_q$. After 814, a plurality of eigenvalues $\lambda_q$ is generated, one for each of training image.

At 818, the method 800 may include grouping a first set (N) of the plurality of eigenvalues $\lambda_q$ into a training set R and a remaining set (M) of the plurality of eigenvalues $\lambda_q$ into a validation set V.

At 820, the method 800 may include aggregating the N training vectors to generate an aggregate vector $\lambda_{AGG}$. For example, generating the aggregate vector $\lambda_{AGG}$ may be given by Equation 5:

$$\lambda_{AGG} = \frac{\sum_{i=1}^{N} \lambda_i}{N}. \tag{5}$$

At 822, the method 800 may include performing optimal threshold estimation to generate an optimum threshold value $d_{th}$. The optimal threshold value $d_{th}$ may be generated based on the aggregate vector $\lambda_{AGG}$ from the training set R and the vectors $$\lambda_i^{val}$$

from the validation set V. For example, the optimal threshold value $d_{th}$ may be generated based on Equation 7:

$$d_{th} = \text{argmax}_i \left| \lambda_{AGG} \lambda_i^{val} \right|. \tag{6}$$

At 824, the method 800 may include aggregating all vectors from the training set R and the validation set V to generate an overall aggregate vector of eigenvalues $$\lambda_{AGG}^*,$$

which may be given by Equation 7:

$$\lambda_{AGG}^* = \frac{\sum_{i=1}^{N} \lambda_i}{T}, \tag{7}$$

in which T=the total number of vectors. The output of the method 800 may include an overall aggregated feature vector $$\lambda_{AGG}^*$$

and optimal threshold value $d_{th}$ that represents a trained TSM 120 for a given set of authentic signatures. The trained TSM 120 (associated aggregated feature vector $$\lambda_{AGG}^*$$

and optimal threshold value $d_{th}$ may be stored in the TSM datastore 103 to be retrieved for signature verification). Once trained, the TSM 120 may be used to verify signatures.

Figure 9A:
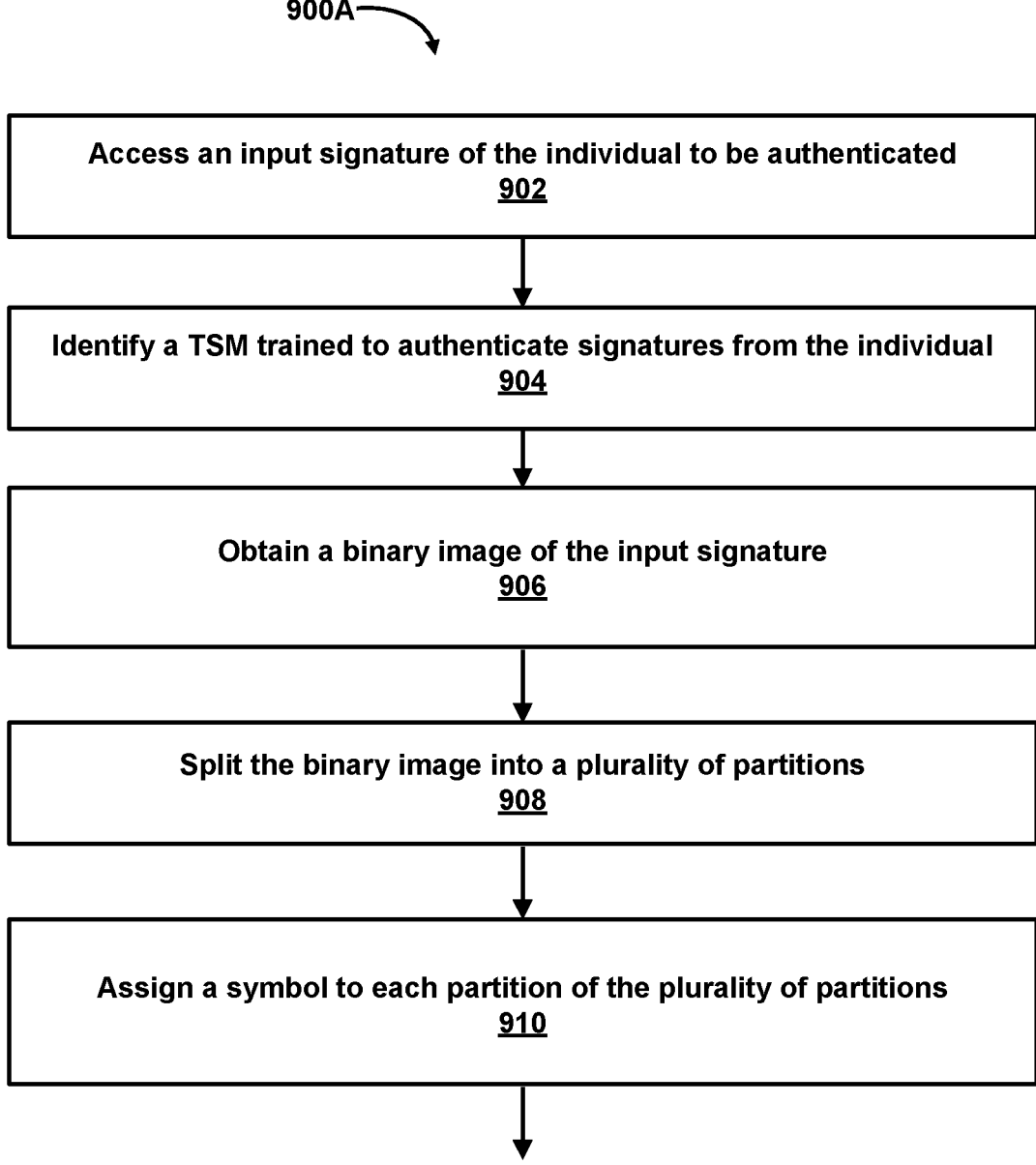
FIG. 9A illustrates a first portion of an example of a method of verifying an input image against a trained TSM.

FIGS. 9A and 9B together illustrate respective portions 900A and 900B of an example of a method of verifying an input image against a TSM 120. At 902, the method 900 may include accessing an input image 102. The input image 102 may be obtained from a wire instruction or other signature source. The method 900 may further include identifying an appropriate TSM 120 for the input image 102. For example, the method 900 may include identifying a person who purportedly made a signature image in the input image 102 and retrieving a TSM 120 that was trained on authentic signatures associated with that person.

At 904, the method 900 may include identifying and retrieving the TSM 120. For example, the method 900 may include retrieving the aggregated feature vector $$\lambda_{AGG}^*$$

and optimal threshold value $d_{th}$ learned from training data. Execution of the TSM 120 may be initialized with a K value equal to the K value used for training the TSM 120. Such K value may also be retrieved from the training datastore 101 or may be a global default value.

At 906, the method 900 may include converting the input image 102 to a binary image. For example, if the input image 102 is an RGB image, the method 900 may include converting the RGB image to a grayscale image, and then converting the grayscale image to a binary image. If the input image 102 is a grayscale image, the method 800 may include converting the grayscale image to a binary image. If a given input image 102 is already a binary image, then no conversion is performed on this image.

At 908-914, the method 800 may include performing signature symbolization on the binary image. For example, at 908, the method 900 may include partitioning the binary image into K partitions. At 910, the method 900 may include assigning a unique symbol for each partition in the binary image. At 912, the method 900 may include determining a plurality of pixel coordinates corresponding to signature lines in the binary image. At 912, the method 900 may include determining, for the set of pixel coordinates $C_q$, a sequence of symbols.

At 916, the method 900 may include generating a stochastic transition matrix $P_{in}$. $P_{in}$ may be generated in a similar manner to the generation of $P_q$ based on Equation (5). The stochastic transition matrix is a measure of the probability of transitioning from one symbol to a next symbol, which is based on the topology of the signature. At 918, the method 900 may include generating a vector of eigenvalues $\lambda_{in}$ for the stochastic transition matrix $P_{in}$ derived from the input image 102.

At 920, the method 900 may include determining whether the input image 102 matches a known authentic signature based on the vector of eigenvalues $\lambda_{in}$ and the TSM 120. For example, the method 900 may include determining a distance between $\lambda_{in}$ and $$\lambda^*_{AGG}$$

and comparing the distance to the optimum threshold value $d_{th}$. The distance D may be determined based on Equation 8:

$$D = |\lambda_{in} - \lambda^*_{AGG}|. \tag{8}$$

If the distance D is >the optimum threshold value $d_{th}$ then the input image 102 is determined to be not verified (deviates too much from an authentic signature of the signer). On the other hand, if the distance D≤the optimum threshold value $d_{th}$ then the input image 102 is determined to be verified.

It is contemplated that the descriptions of FIGS. 8 and 9 may each or both be used with any other embodiment of this disclosure. In addition, the descriptions described in relation to FIGS. 8 and 9 may be performed in alternative orders, or in parallel to further the purposes of this disclosure. For example, each of the operations of FIG. 8 and/or FIG. 9 may be performed in any order, in parallel, or simultaneously to reduce lag, or increase the speed of the system or method. Furthermore, it should be noted that any of the devices or equipment discussed in relation to FIGS. 1 and 2 may be used to programmed to perform one or more of the operations of FIG. 8 and/or FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of authenticating a signature, comprising:
a memory configured to store a topological stochastic model (TSM) trained to authenticate signatures, the TSM comprising an aggregate vector of eigenvalues that is aggregated from vectors of eigenvalues corresponding to respective authentic signatures of a signee;
a processor programmed to:
access an input image of a signee to be authenticated;

identify the TSM trained to authenticate signatures from the signee;
obtain a binary image of the input image;
split the binary image into a plurality of partitions;
assign a symbol to each partition of the plurality of partitions;
identify pixel coordinates in the binary image that include at least a portion of the input image;
determine a sequence of symbols representing a topological traversal path of the signature based on the identified pixel coordinates in the binary image, the sequence of symbols corresponding to the partitions that correspond to the identified pixel coordinates;
determine an input stochastic transition matrix based on the sequence;
generate an input vector of eigenvalues based on the input stochastic transition matrix;
determine a distance between the input vector of eigenvalues and the aggregate vector of eigenvalues of the TSM; and
determine whether the input image is authentic based on the distance.

2. The system of claim 1, wherein the plurality of partitions are each shaped as a rectangle.

3. The system of claim 1, wherein to determine whether the input image is authentic, the processor is further programmed to: compare the distance to an optimal threshold value; and determine that the input image is authentic when the distance is greater than the optimal threshold value.

4. The system of claim 1, wherein to obtain the binary image, the processor is programmed to: convert a red-green-blue (RGB) image of the input image to a grayscale image; and convert the grayscale image to the binary image.

5. A non-transitory computer-readable medium storing instructions that, when executed by a processor, programs the processor to:
access an input image of a signee to be authenticated;
identify a topological stochastic model (TSM) trained to authenticate signatures from the signee, the TSM comprising an aggregate vector of eigenvalues that is aggregated from vectors of eigenvalues corresponding to respective authentic signatures of a signee;
obtain a binary image of the input image;
split the binary image into a plurality of partitions;
assign a symbol to each partition of the plurality of partitions;
identify pixel coordinates in the binary image that include at least a portion of the input image;
determine a sequence of symbols representing a topological traversal path of the signature based on the identified pixel coordinates in the binary image, the sequence of symbols corresponding to the partitions that correspond to the identified pixel coordinates;
determine an input stochastic transition matrix based on the sequence;
generate an input vector of eigenvalues based on the input stochastic transition matrix;
determine a distance between the input vector of eigenvalues and the aggregate vector of eigenvalues of the TSM; and
determine whether the input image is authentic based on the distance.

6. The non-transitory computer-readable medium of claim 5, wherein the plurality of partitions are each shaped as a rectangle.

7. The non-transitory computer-readable medium of claim 5, wherein to determine whether the input image is authentic, the instructions when executed by the processor, further program the processor to:

compare the distance to an optimal threshold value; and determine that the input image is authentic when the distance is greater than the optimal threshold value.

8. The non-transitory computer-readable medium of claim 5, wherein to obtain the binary image, the instructions when executed by the processor, further program the processor to:

convert a red-green-blue (RGB) image of the input image to a grayscale image; and convert the grayscale image to the binary image.

9. A method of training a topological stochastic model (TSM) for signature verification, comprising:

accessing, by a computing device, a first sample of an authentic signature of a person and a second sample of the authentic signature of the person;

generating, by the computing device, a first vector of eigenvalues for the first authentic signature based on TSM feature extraction on the first authentic signature;

generating, by the computing device, a second vector of eigenvalues for the second authentic signature based on TSM feature extraction on the second authentic signature;

aggregating, by the computing device, the first vector of eigenvalues and the second vector of eigenvalues; and generating, by the computing device, an aggregate vector of eigenvalues based on the aggregating, wherein the aggregate vector of eigenvalues is used as an authentication model against which an input image is authenticated.

10. The method of claim 9, wherein aggregating the first vector of eigenvalues and the second vector of eigenvalues comprises determining a mean of the first vector of eigenvalues and the second vector of eigenvalues.

11. The method of claim 9, the method further comprising:

performing an optimal threshold estimation to determine a threshold value based on the aggregate vector of eigenvalues, the first vector of eigenvalues and the second vector of eigenvalues.

12. The method of claim 11, the method further comprising:

determining an optimal threshold value against which a distance between the aggregate vector of eigenvalues and an input vector of eigenvalues for the input image is evaluated to determine whether the input image is authentic.

13. The method of claim 12, wherein determining the optimal threshold value comprises:

determining a maximum value from among: a first distance between the aggregate vector of eigenvalues and the first vector of eigenvalues and a second distance between the aggregate vector of eigenvalues and the second vector of eigenvalues.

14. The method of claim 9, wherein generating the first vector of eigenvalues for the first authentic signature based on TSM feature extraction on the first authentic signature comprises:

obtaining a binary image of the first authentic signature for processing.

15. The method of claim 14, wherein an image of the first authentic signature comprises a red-green-blue (RGB) image, and wherein obtaining the binary image comprises: converting the RGB image to a grayscale image; and converting the grayscale image to the binary image.

16. The method of claim 14, wherein an image of the first authentic signature comprises a grayscale image, and wherein obtaining the binary image comprises: converting the grayscale image to the binary image.

17. The method of claim 14, wherein the TSM feature extraction further comprises: converting xy coordinates of the binary image to a plurality of symbols that each represent a portion of the first authentic signature.

18. The method of claim 17, wherein a number of the plurality of symbols that is generated is defined by an integer K to generate K equal rectangles based on the xy coordinates of the binary image.

19. The method of claim 17, wherein the TSM feature extraction further comprises: generating a stochastic transition matrix based on the plurality of symbols, wherein the first vector of eigenvalues is generated based on the stochastic transition matrix.

20. The method of claim 19, wherein generating the stochastic transition matrix comprises:

determining a sequence of the plurality of symbols with respect to the xy coordinates; and determining a number of transitions from one symbol to another symbol based on the sequence.

* * * * *